United States Patent
Fukawatase et al.

(10) Patent No.: US 8,262,129 B2
(45) Date of Patent: Sep. 11, 2012

(54) OCCUPANT PROTECTION DEVICE

(75) Inventors: Osamu Fukawatase, Aichi-ken (JP); Shuji Yamada, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 48 days.

(21) Appl. No.: 12/551,757

(22) Filed: Sep. 1, 2009

(65) Prior Publication Data

US 2010/0025975 A1 Feb. 4, 2010

Related U.S. Application Data

(60) Provisional application No. 61/176,965, filed on May 11, 2009.

(30) Foreign Application Priority Data

Dec. 25, 2007 (JP) .................................. 2007-333037

(51) Int. Cl.
*B60R 21/276* (2006.01)
*B60R 21/2338* (2011.01)
(52) U.S. Cl. ..................................... 280/739; 280/743.2
(58) Field of Classification Search .................. 102/530, 102/531; 280/735, 736, 738, 741, 742, 743.1, 280/743.2, 739; 701/45
See application file for complete search history.

(56) References Cited

U.S. PATENT DOCUMENTS

| | | | |
|---|---|---|---|
| 5,695,214 A | 12/1997 | Faigle et al. | |
| 5,879,024 A * | 3/1999 | Estep | 280/735 |
| 6,254,124 B1 | 7/2001 | Angermaier | |
| 6,327,528 B1 * | 12/2001 | Vallette et al. | 701/45 |
| 6,343,758 B1 | 2/2002 | Abe et al. | |
| 6,398,257 B1 | 6/2002 | Ehama et al. | |
| 6,435,440 B1 | 8/2002 | Hori | |
| 6,454,300 B1 * | 9/2002 | Dunkle et al. | 280/742 |
| 6,513,835 B2 * | 2/2003 | Thomas | 280/743.2 |
| 6,616,184 B2 * | 9/2003 | Fischer | 280/743.2 |
| 6,746,044 B2 * | 6/2004 | Elqadah et al. | 280/736 |
| 6,773,030 B2 * | 8/2004 | Fischer | 280/739 |
| 6,832,778 B2 * | 12/2004 | Pinsenschaum et al. | 280/739 |
| 6,910,653 B2 | 6/2005 | Tanji | |

(Continued)

FOREIGN PATENT DOCUMENTS

JP 11091501 A 4/1999

(Continued)

OTHER PUBLICATIONS

Office Action for U.S. Appl. No. 13/039,903 dated May 6, 2011; 23 pages.

(Continued)

*Primary Examiner* — Joseph Rocca
(74) *Attorney, Agent, or Firm* — Gifford, Krass, Sprinkle, Anderson & Citkowski, P.C.

(57) ABSTRACT

An occupant protection device includes a plurality of gas generators that actuate respective mechanisms, and a control portion that actuates the gas generators. If a condition for actuating at least one of the gas generators is fulfilled and a condition for actuating the other gas generators are unfulfilled, the other gas generators are controlled by the control portion at a timing that is uninfluential on an actuation state of one of the mechanism actuated by the one of the gas generators and that is different from a preset timing for actuating the other mechanisms actuated by the other gas generators.

4 Claims, 8 Drawing Sheets

U.S. PATENT DOCUMENTS

| | | | |
|---|---|---|---|
| 7,354,064 B2* | 4/2008 | Block et al. | 280/743.2 |
| 7,690,681 B2* | 4/2010 | Hall et al. | 280/739 |
| 7,731,117 B2 | 6/2010 | Yasuda et al. | |
| 7,845,678 B2* | 12/2010 | Pausch | 280/735 |
| 2002/0027345 A1* | 3/2002 | Aoki | 280/735 |
| 2002/0117840 A1* | 8/2002 | Dunkle et al. | 280/743.2 |
| 2003/0020266 A1* | 1/2003 | Vendely et al. | 280/739 |
| 2003/0090091 A1* | 5/2003 | Dominissini et al. | 280/730.2 |
| 2004/0017069 A1* | 1/2004 | Fischer | 280/739 |
| 2004/0155443 A1* | 8/2004 | Ford | 280/739 |
| 2004/0251364 A1 | 12/2004 | Kim | |
| 2005/0098990 A1* | 5/2005 | Pinsenschaum et al. | 280/739 |
| 2006/0170202 A1* | 8/2006 | Block et al. | 280/743.2 |
| 2006/0192370 A1* | 8/2006 | Abe et al. | 280/735 |
| 2007/0001047 A1 | 1/2007 | Yasuda et al. | |
| 2007/0102911 A1* | 5/2007 | Hall et al. | 280/739 |
| 2010/0201107 A1* | 8/2010 | Abe et al. | 280/730.1 |
| 2011/0035117 A1 | 2/2011 | Yamada et al. | |

FOREIGN PATENT DOCUMENTS

| | | |
|---|---|---|
| JP | 2000025556 A | 1/2000 |
| JP | 2000326819 A | 11/2000 |
| JP | 2001260811 A | 9/2001 |
| JP | 2004521801 T | 7/2004 |
| JP | 2005-112302 A | 4/2005 |
| JP | 2006264672 A | 10/2006 |
| WO | 2009/101512 | 8/2009 |

OTHER PUBLICATIONS

Office Action in corresponding JP application No. 2010-011822 dated Nov. 1, 2011; 4 pgs.

* cited by examiner

FIG. 3A

| | IGNITION STATE OF VENT HOLE MGG |
|---|---|
| SEAT BELT WORN | IGNITED |
| SEAT BELT NOT WORN | NOT IGNITED |

FIG. 3B

| | IGNITION STATE OF VENT HOLE MGG | |
|---|---|---|
| | LOW SPEED (LOWER THAN 25 mph) | HIGH SPEED (EQUAL TO OR HIGHER THAN 25 mph) |
| SEAT BELT WORN | IGNITED (MGG IGNITED AFTER LAPSE OF 100 TO 150 ms FROM IGNITION OF AIRBAG INFLATOR) | IGNITED (MGG IGNITED IN SYNCHRONIZATION WITH IGNITION OF AIRBAG INFLATOR) |
| SEAT BELT NOT WORN | IGNITED (MGG IGNITED AFTER LAPSE OF 100 TO 150 ms FROM IGNITION OF AIRBAG INFLATOR) | IGNITED (MGG IGNITED AFTER LAPSE OF 100 TO 150 ms FROM IGNITION OF AIRBAG INFLATOR) |

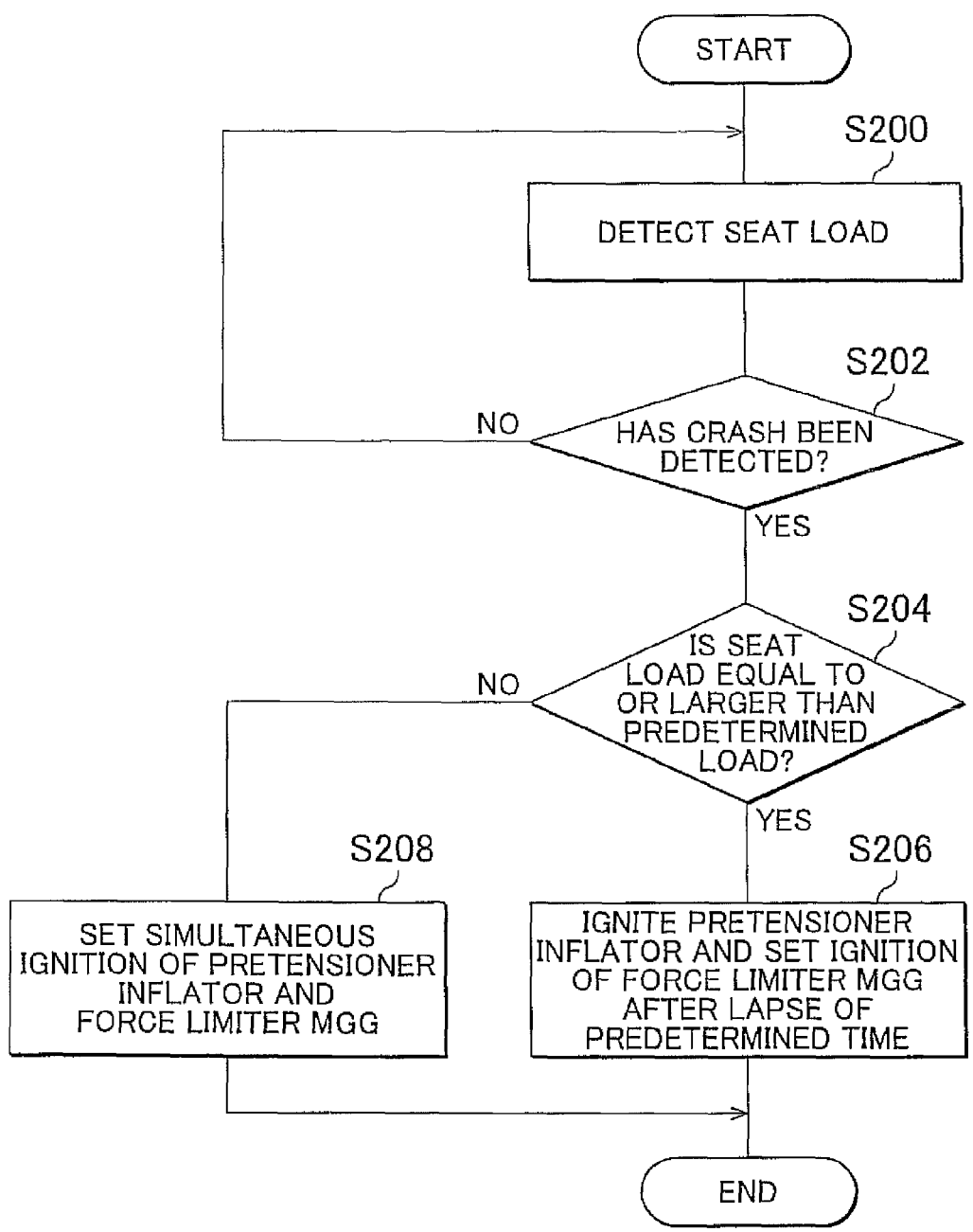

OCCUPANT PROTECTION DEVICE

INCORPORATION BY REFERENCE

This application is based on and claims the benefit of U.S. Provisional Application No. 61/176,965, filed May 11, 2009, and the disclosure of Japanese Patent Application No. 2007-333037 filed on Dec. 25, 2007 including the specification, drawings and abstract is incorporated herein by reference in its entirety.

BACKGROUND OF THE INVENTION

1. Field of the Invention

The invention relates to an occupant protection device.

2. Description of the Related Art

An airbag device that deploys a bag body upon a crash to absorb an impact on an occupant can be mentioned as a representative occupant protection device. Various arts are proposed for the airbag device.

For example, in an art described in Japanese Patent Application Publication No. 2006-264672 (JP-A-2006-264672), it is proposed to control the opening of a vent hole provided in a bag body of an airbag device by means of a micro gas generator (hereinafter referred to as MGG) that generates gas.

Further, in an art described in Published Japanese Translation of PCT Application No. 2004-521801 (JP-A-2004-521801), it is proposed to control a strap for controlling the size (capacity) of a bag body by means of an MGG to control the size of deployment of the bag body.

Further, in an art described in U.S. Pat. No. 6,513,835, it is proposed to control the size of deployment of a bag body and a vent hole by means of an MGG.

By controlling the size of deployment of the bag body and the vent hole as described above, an airbag device can be appropriately actuated on the basis of a state of use of a seat, a wearing state of a seat belt, prediction of a crash, a state of an accident, a crash speed, a weight of an occupant, and the like.

However, when an occupant protection device is equipped with a plurality of gas generators to control the deployment of a bag body of an airbag device, the size of deployment of the bag body and a vent hole, and the like as is the case with the aforementioned related arts, those of the gas generators which have not been actuated remain in performing a discharge task on the condition that only one of the gas generators be actuated. Thus, a troublesome operation of igniting and discharging those gas generators is required in performing the discard task.

SUMMARY OF THE INVENTION

It is an object of the invention to provide an occupant protection device that makes it easy to discard the discharged gas generators.

An occupant protection device according to a first aspect of the invention has a plurality of gas generators that are provided in respective mechanisms for protecting an occupant to generate gas for actuating the respective mechanisms, and a control portion that performs control such that, if a condition for actuating at least one of the gas generators is fulfilled and conditions for actuating the other gas generators different from the one of the gas generators whose condition is fulfilled are unfulfilled, the one of the gas generators whose condition is fulfilled is actuated, and performs control such that the other gas generators whose conditions are unfulfilled are actuated at a timing that is uninfluential on an actuation state of one of the mechanisms which is actuated by the one of the gas generators whose condition is fulfilled and that is different from a preset timing for actuating the other mechanisms which are actuated by the other gas generators whose conditions are unfulfilled.

According to the foregoing aspect of the invention, the plurality of the gas generators are provided in the respective mechanisms for protecting the occupant to generate gas for actuating the respective mechanisms.

The control portion performs control such that, if a condition for actuating at least one of the gas generators is fulfilled and conditions for actuating the other gas generators different from the one of the gas generators whose condition is fulfilled are unfulfilled, the one of the gas generators whose condition is fulfilled is actuated, and performs control such that the other gas generators whose conditions are unfulfilled are actuated at the timing that is uninfluential on the actuation state of one of the mechanisms which is actuated by the one of the gas generators whose condition is fulfilled and that is different from the preset timing for actuating the other mechanisms which are actuated by the other gas generators whose conditions are unfulfilled. Thus, none of the gas generators fail to be actuated. Therefore, the gas generators can be easily discarded without recourse to the operation of igniting and discharging the gas generators.

In the foregoing aspect of the invention, the plurality of the gas generators may include a first gas generator that generates gas for actuating a first mechanism for protecting the occupant, and a second gas generator that generates gas for actuating a second mechanism for supplementing an occupant protection function of the first mechanism. The control portion may perform control such that the first gas generator is actuated if a condition for actuating only the first gas generator is fulfilled, and perform control such that the second gas generator is actuated at a timing that is uninfluential on actuation of the first mechanism and that is different from a preset timing for actuating the second mechanism.

According to the foregoing aspect of the invention, the first gas generator actuates the first mechanism that generates gas to protect the occupant, and the second gas generator actuates the second mechanism that generates gas to supplement the occupant protection function of the first mechanism.

For example, the first gas generator may deploy a bag body of an airbag device as the first mechanism, and the second gas generator may actuate a mechanism for opening a lid member that closes a vent hole for adjusting an internal pressure of the bag body as the second mechanism. Further, the first gas generator may deploy a bag body of an airbag device as the first mechanism, and the second gas generator may actuate a cancellation mechanism that cancels a regulation by a strap provided inside the bag body as the second mechanism to regulate a size of deployment of the bag body. Further, the first gas generator may actuate a retraction mechanism that retracts a seat belt for restraining the occupant as the first mechanism, and the second gas generator may actuate a change mechanism that changes a tensile force applied to the retracted seat belt as the second mechanism. That is, the concept of the occupant protection device according to each variation of the foregoing aspect of the invention is applicable to various occupant protection devices equipped with two gas generators.

The control portion performs control such that the first gas generator is actuated if the condition for actuating only the first gas generator is fulfilled, and performs control such that the second gas generator is actuated at the timing that is uninfluential on the actuation of the first mechanism and that is different from the preset timing for actuating the second mechanism. That is, even on the condition that only one of the gas generators be actuated, the other gas generator is actuated without influencing the other mechanism. Therefore, the gas generators can be easily discarded without recourse to the operation of igniting and discharging the gas generators.

For example, the control portion may perform control such that the first gas generator is actuated, and perform control such that the second gas generator is actuated at a timing after a lapse of a predetermined time from a timing when the first gas generator is controlled.

The condition for actuating the first gas generator may be a condition regarding crash information, and the condition for actuating the second gas generator may be a condition having at least one of information on whether the occupant wears the seat belt, information on an intensity of a crash, information on a build of the occupant, and information on a posture of the occupant as a parameter.

An occupant protection device according to a second aspect of the invention has an airbag bag body provided with at least one of a lid member that covers a vent hole for adjusting an internal pressure of the airbag bag body and a strap that regulates a size of deployment of the airbag bag body, a change portion that changes at least one of the internal pressure of the airbag bag body by opening of the lid member and a deployment capacity of the airbag bag body by cancellation of regulation by the strap, a first gas generator that generates gas for deploying the airbag bag body, a detection portion that detects at least one parameter selected from information on whether an occupant wears a seat belt, information on an intensity of a crash, information on a build of the occupant, and information on a posture of the occupant, a second gas generator that actuates the change portion based on the information detected by the detection portion, and a control portion that performs control such that the first gas generator is actuated if only a condition for deploying the airbag bag body is fulfilled, and performs control such that the second gas generator is actuated at a timing after a lapse of a predetermined time from a timing when the first gas generator is controlled.

According to the foregoing second aspect of the invention, the airbag bag body has at least one of the lid member that covers the vent hole for adjusting the internal pressure of the airbag bag body, and the strap that regulates the size of deployment of the airbag bag body.

The change portion changes at least one of the internal pressure of the airbag bag body by opening of the lid member and the deployment capacity of the airbag bag body by cancellation of regulation by the strap.

The first gas generator generates gas to deploy the airbag bag body.

The detection portion detects at least one parameter selected from the information on whether the occupant wears the seat belt, the information on the intensity of the crash, the information on the build of the occupant, and the information on the posture of the occupant.

Further, the second gas generator generates gas to actuate the change portion based on the information detected by the detection portion.

Then, the control portion performs control such that the first gas generator is actuated if only the condition for deploying the airbag bag body is fulfilled, and performs control such that the second gas generator is actuated at the timing after the lapse of the predetermined time from the timing when the first gas generator is controlled. That is, even on the condition that only the first gas generator be actuated, the second gas generator is actuated without influencing the other mechanism. Therefore, the gas generators can be easily discarded without recourse to the operation of igniting and discharging the gas generators.

In the foregoing second aspect of the invention, the occupant protection device may further have a vehicle speed detection portion that detects a vehicle speed. The occupant protection device may be set such that only the condition for deploying the airbag bag body is fulfilled if the detection portion detects that the occupant wears the seat belt and the vehicle speed detection portion detects that the vehicle speed is equal to or higher than a predetermined vehicle speed.

Further, the control portion may perform control such that the first gas generator is actuated if only the condition for deploying the airbag bag body is fulfilled, and perform control such that the second gas generator is actuated at a timing that is uninfluential on deployment of the airbag bag body and that is different from a preset timing for actuating the change portion.

An occupant protection device according to a third aspect of the invention has a seat belt unit including a seat belt for restraining an occupant and a retraction unit for retracting the seat belt, a tensile force adjustment portion that adjusts a tensile force applied to the seat belt such that so as to reduce the tensile force if the occupant is restrained by the seat belt, a first gas generator that generates gas for rotating the retraction unit so as to retract the seat belt, a detection portion that detects information on a build of the occupant, a second gas generator that generates gas for actuating the tensile force adjustment portion based on the information on the build of the occupant detected by the detection portion, and a control portion that performs control such that the first gas generator is actuated if a condition for actuating only the first gas generator is fulfilled, and performs control such that the second gas generator is actuated at a timing after a lapse of a predetermined time from a timing when the first gas generator is actuated.

According to the foregoing third aspect of the invention, the seat belt unit has the seat belt for restraining the occupant and the retraction unit for retracting the seat belt.

The tensile force adjustment portion adjusts the tensile force applied to the seat belt so as to reduce the tensile force if the occupant is restrained by the seat belt.

The first gas generator generates gas to rotate the retraction unit so as to retract the seat belt.

The detection portion detects the information on the build (e.g., a weight) of the occupant.

Further, the second gas generator generates gas to actuate the tensile force adjustment portion based on the information on the build of the occupant detected by the detection portion.

Then, the control portion performs control such that the first gas generator is actuated if the condition for actuating only the first gas generator is fulfilled, and performs control such that the second gas generator is actuated at the timing after the lapse of the predetermined time from the timing when the first gas generator is actuated. That is, even on the condition that only the first gas generator be actuated, the second gas generator is actuated without influencing the other mechanism. Therefore, the gas generators can be easily discarded without recourse to the operation of igniting and discharging the gas generators.

The control portion may perform control such that the first gas generator is actuated if only the condition for actuating only the first gas generator is fulfilled, and perform control such that the second gas generator is actuated at a timing that is uninfluential on restraint of the occupant and that is different from a preset timing for actuating the tensile force adjustment portion.

As described above, according to each of the aspects of the invention, the control portion performs control such that, if a condition for actuating even at least one of the plurality of the gas generators is unfulfilled, those of the plurality of the gas generators which have not been actuated are actuated at a timing that is uninfluential on an actuation state of one of the mechanisms which is actuated upon fulfillment of the condition and that is different from a preset timing for actuating the mechanisms by those of the gas generators to which the condition is unfulfilled. Thus, none of the gas generators fail to be actuated. Therefore, the gas generators can be easily discarded without recourse to the operation of igniting and discharging the gas generators.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 3A is a table showing a timing for igniting a conventional vent hole MGG;

FIG. 3B is a table showing a timing for igniting a vent hole MGG of the airbag device according to the first embodiment of the invention;

FIG. 8 is a flowchart showing an example of the flow of a seat belt tensile force control processing performed by a seat belt control ECU of the seat belt retractor unit according to the second embodiment of the invention.

DETAILED DESCRIPTION OF THE PREFERRED EMBODIMENTS

Exemplary embodiments of the invention will be described hereinafter in detail with reference to the drawings.

Figure 1:
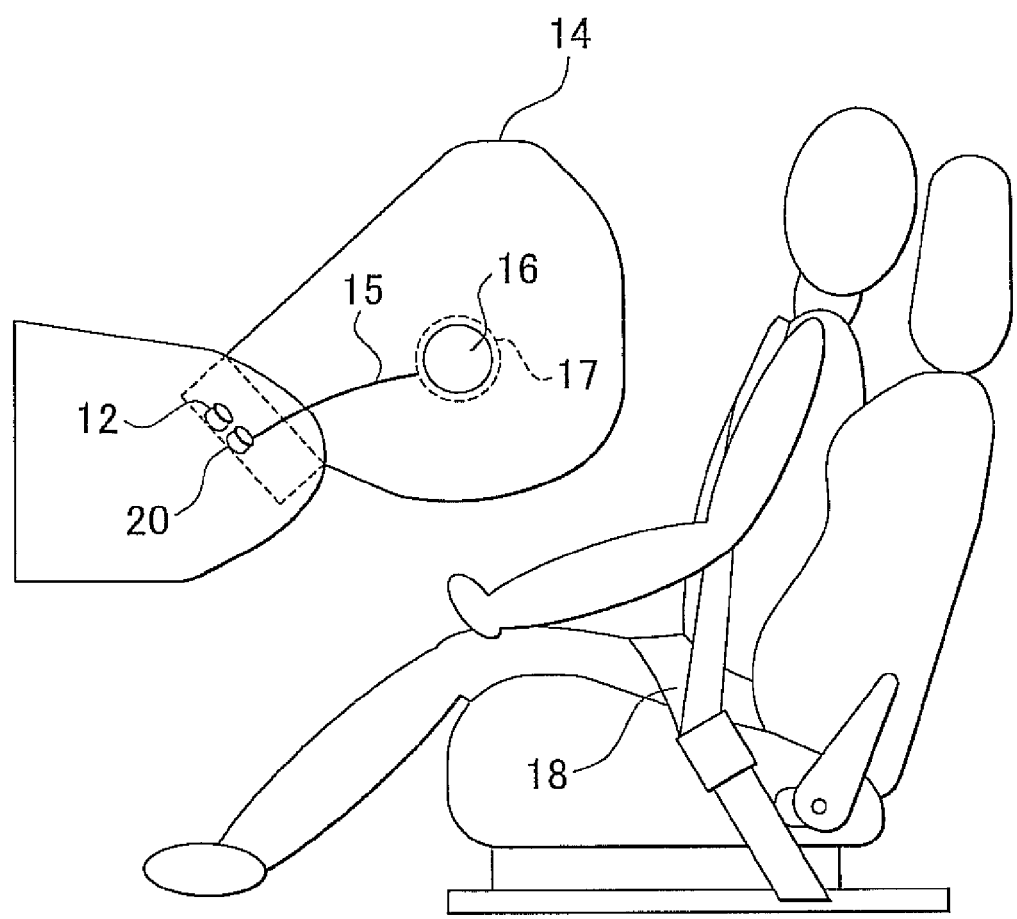
FIG. 1 is a view for explaining a schematic construction of an airbag device according to the first embodiment of the invention.

FIG. 1 is a view for explaining a schematic construction of an airbag device according to the first embodiment of the invention. In this embodiment of the invention, the invention is applied to the airbag device.

The airbag device according to the first embodiment of the invention ignites a gas generator (airbag inflator) 12 for generating gas upon a crash to deploy a bag body 14, thereby absorbing an impact on an occupant. The airbag device to which the invention is applied is equipped with two airbag inflators 12. When a crash occurs at a low speed (a crash occurs at a speed equal to or lower than a predetermined speed) or the occupant sits close to the airbag device (the position of a seat is located in front of a predetermined position), the inflator at the first stage is ignited, and the inflator at the second stage is then ignited after the lapse of a predetermined time. The speed of deployment of an airbag is thereby reduced upon the crash at the low speed or the crash occurring to the occupant sitting close to the airbag device. When a crash occurs, for example, at a high speed, the inflator at the first stage and the inflator at the second stage (so-called dual stage inflators) are simultaneously ignited. In the following description, however, the timings for igniting the two inflators will not be mentioned. These inflators will be described simply as the airbag inflator 12.

The bag body 14 is equipped with a vent hole 16 for adjusting an internal pressure of the bag body 14, and the vent hole 16 opens a lid member 17 for selectively covering the vent hole 16 on the basis of a signal indicating whether or not the occupant wears a seat belt 18.

The vent hole 16 is opened by pulling a strap 15 that connects to the lid member 17 that covers the vent hole 16, due to a gas from a micro gas generator (vent hole MGG) 20 that generates gas. Various known arts are applicable to a method of opening the vent hole 16.

Figure 2:
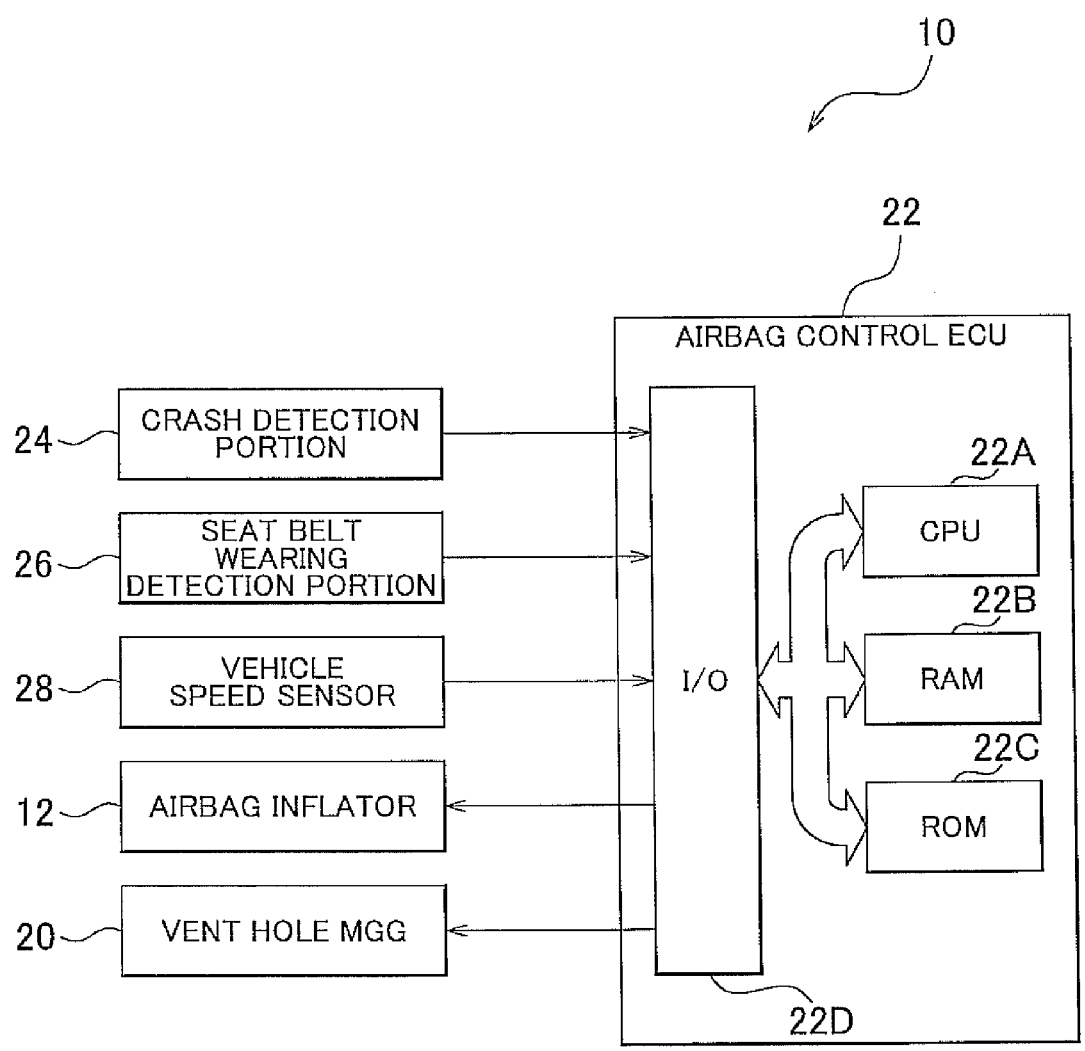
FIG. 2 is a block diagram showing a configuration of the airbag device according to the first embodiment of the invention.

FIG. 2 is a block diagram showing the configuration of the airbag device according to the first embodiment of the invention.

In an airbag device 10 according to the first embodiment of the invention, the deployment of the bag body 14 is controlled by an airbag control ECU 22.

The airbag control ECU 22 is constituted by a microcomputer equipped with a CPU 22A, a RAM 22B, a ROM 22C, and an input/output interface (I/O) 22D.

The ROM 22C has stored therein various programs for controlling the airbag device 10, a threshold for deploying the bag body 14 of the airbag device 10, and the like.

The CPU 22A expands the programs and the like stored in the ROM 22C into the RAM 22B and the like to perform deployment control of the bag body 14.

A crash detection portion 24, a seat belt wearing detection portion 26, a vehicle speed sensor 28, the airbag inflator 12, and the vent hole MGG 20 are connected to the I/O 22D.

The crash detection portion 24 includes, for example, crash detection sensors provided on a vehicle floor, a front side member, and the like, an acceleration sensor, and the like. The crash detection portion 24 detects a crash of the vehicle and outputs a result of the detection to the airbag control ECU 22.

The seat belt wearing detection portion 26 is composed of a switch that detects whether or not a seat belt tongue is inserted in a seat belt buckle, and the like. The seat belt wearing detection portion 26 detects whether or not the occupant wears the seat belt, and outputs a result of the detection to the airbag control ECU 22.

The vehicle speed sensor 28 detects a running speed of the vehicle, and outputs a result of the detection to the airbag control ECU 22. In the configuration according to this embodiment of the invention, the vehicle speed sensor 28 is directly connected to the airbag control ECU 22. However, it is also appropriate to connect an engine control ECU instead of the vehicle speed sensor 28, and input indirectly to the airbag control ECU 22 a vehicle speed input to the engine control ECU.

The airbag inflator 12 receives an ignition signal from the airbag control ECU 22, and generates gas to deploy the bag body 14 accommodated in an instrument panel, a steering wheel, and the like.

The vent hole MGG 20 receives a vent hole opening signal from the airbag control ECU 22, generates gas to pull the strap 15 connected to the lid member 17 of the vent hole 16, and thereby opens the vent hole 16 to release a pressure in the bag body 14.

FIG. 3A is a table showing an ignition timing of a conventional vent hole MGG 20, and FIG. 3B is a table showing an ignition timing of the vent hole MGG 20 of the airbag device 10 according to the first embodiment of the invention.

Conventionally, the vent hole MGG 20 is ignited on the basis of a signal indicating whether or not the occupant wears the seat belt as shown in, for example, FIG. 3A. That is, when the occupant does not wear the seat belt, the vent hole MGG 20 is not ignited. Accordingly, even when the airbag inflator 12 is ignited to deploy the bag body 14, the vent hole MGG 20 is still not ignited. It is therefore necessary to ignite and discharge the vent hole MGG 20 in discarding the airbag device 10 prior to discarding the airbag device 10.

On the other hand, in this embodiment of the invention, as shown in FIG. 3B, if the occupant wears the seat belt and the vehicle speed is low (lower than 25 mph), the airbag inflator 12 is ignited and the vent hole MGG 20 is then ignited with a delay of 100 to 150 ms after the ignition of the airbag inflator 12. Further, if the occupant wears the seat belt and the vehicle speed is high (equal to or higher than 25 mph), the vent hole MGG 20 is ignited in synchronization with the airbag inflator 12. Further, if the occupant does not wear the seat belt and the vehicle speed is low or high, the airbag inflator 12 is ignited and the vent hole MGG 20 is then ignited with a delay of 100 to 150 ms. That is, in this embodiment of the invention, the two gas generators are ignited in any case. The vent hole MGG 20 may be ignited on the basis of only a signal indicating whether or not the occupant wears the seat belt as shown in FIG. 3A. In this case, when there is no need to ignite the vent hole MGG 20 (when the occupant does not wear the seat belt), the airbag inflator 12 is ignited and the vent hole MGG 20 is then ignited with a delay of 100 to 150 ms. Further, an ignition delay time (100 to 150 ms) shown in FIG. 3B, which depends on, for example, a time during which electric charges can be accumulated on a capacitor or the like provided in the airbag control ECU 22 and differs depending on the type of the vehicle, corresponds to a timing that is uninfluential on the deployment of the bag body 14 and that is different from a preset timing for opening the vent hole 16.

Further, in this embodiment of the invention, a dual stage inflator is applied as the airbag inflator 12. Therefore, when the inflator at the first stage and the inflator at the second stage are simultaneously actuated, the internal pressure of the bag body 14 becomes too high. As a result, if the occupant wears the seat belt and a crash occurs at a high speed, the vent hole 16 is opened. In general, however, the vent hole 16 is opened if a crash occurs at a low speed or the occupant wears the seat belt, and the vent hole 16 is closed if a crash occurs at a high speed or the occupant does not wear the seat belt. That is, in the case where, for example, a single inflator is provided as the airbag inflator 12 instead of the dual stage inflator, the vent hole 16 may be opened if, for example, the occupant wears the seat belt and a crash occurs at a low speed, and the vent hole 16 may be closed if, for example, the occupant wears the seat belt and a crash occurs at a high speed.

In the design according to this embodiment of the invention, the lid member 17 of the vent hole 16 needs to be opened only if the occupant wears the seat belt and a crash occurs at a high speed. In the case where the size of the vent hole 16 is determined and there is no need to open the lid member 17 of the vent hole 16, the vent hole MGG 20 is ignited with a delay of a time (100 to 150 ms) that does not hinder the deployment of the airbag device 10 or the function of the vent hole 16, namely, at a timing that is uninfluential on other mechanisms and that is different from a timing for actuating a mechanism whose actuation condition is unfulfilled. Thus, the two MGG's have been ignited at the time of discarding the airbag device 10. Therefore, the airbag device can be discarded without recourse to any troublesome operation.

Figure 4:
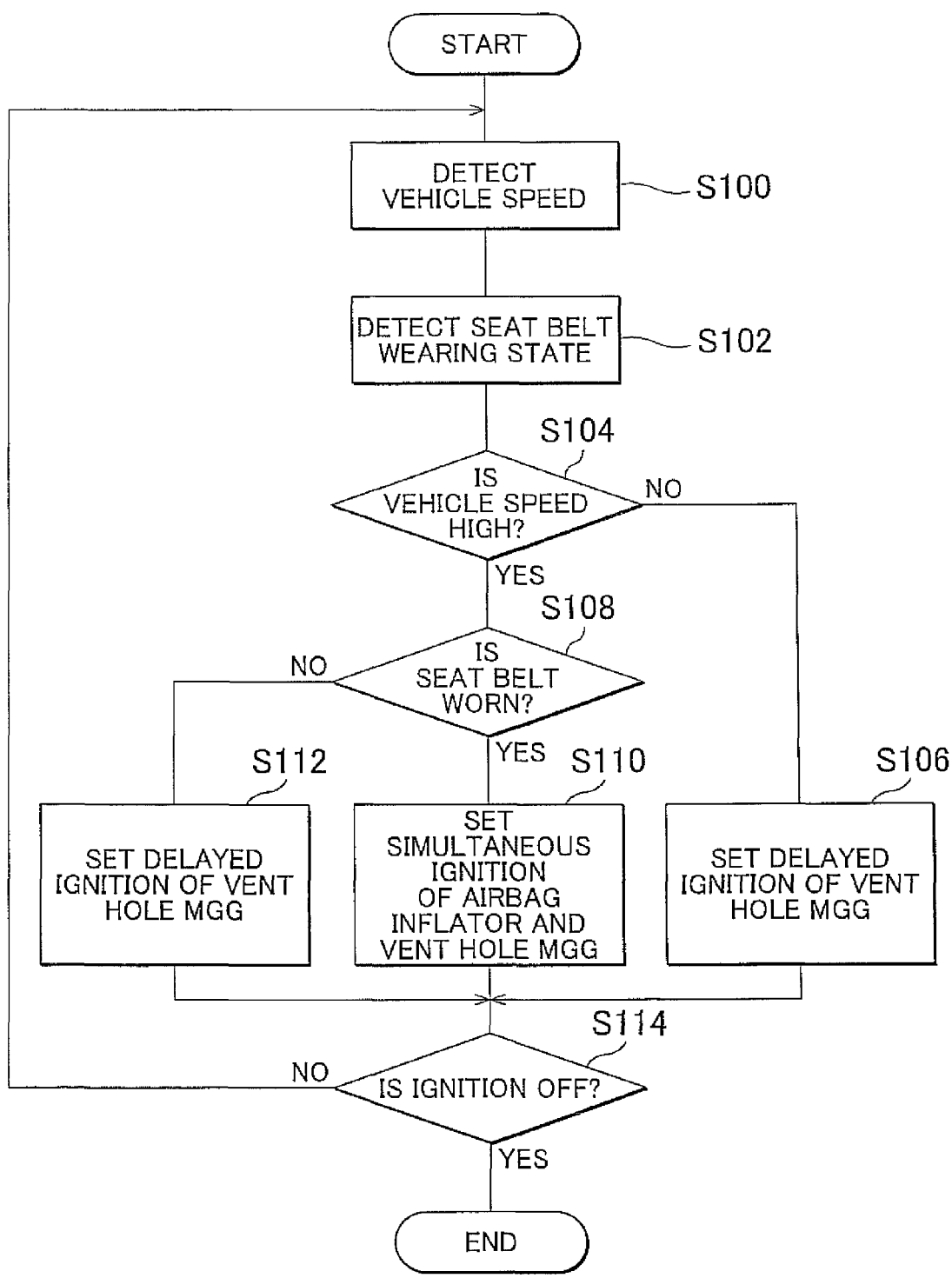
FIG. 4 is a flowchart showing the flow of a processing for determining whether or not the vent hole should be opened, which is performed by an airbag control ECU of the airbag device according to the first embodiment of the invention.

FIG. 4 is a flowchart showing the flow of a processing for determining whether or not the lid member 17 provided at the vent hole 16 should be opened by the airbag control ECU 22 of the airbag device 10 according to the first embodiment of the invention. This processing is started when an ignition switch is turned on.

First of all in step 100, the vehicle speed sensor 28 detects a vehicle speed, and a transition to step 102 is made.

In step 102, the seat belt wearing detection portion 26 detects the wearing of the seat belt, and a transition to step 104 is made.

In step 104, the CPU 22A determines whether or not a result of the detection of the vehicle speed is a high speed (equal to or higher than 25 mph in this embodiment of the invention). When this determination is denied, a transition to step 106 is made. When this determination is affirmed, a transition to step 108 is made.

In step 106, the vent hole MGG 20 is set so as to ignite with a delay of 100 to 150 ms with respect to the ignition of the airbag inflator 12, and a transition to step 114 is made.

On the other hand, in step 108, the CPU 22A determines whether or not the occupant wears the seat belt. When this determination is affirmed, a transition to step 110 is made. When this determination is denied, a transition to step 112 is made.

In step 110, the vent hole MGG 20 is set so as to ignite simultaneously with the airbag inflator 12, and a transition to step 114 is made.

On the other hand, in step 112, the vent hole MGG 20 is set so as to ignite at a timing delayed with respect to an ignition timing of the airbag inflator 12 by 100 to 150 ms, and a transition to step 114 is made.

It is then determined in step 114 whether or not the ignition switch has been turned off. When this determination is denied, a return to step 100 is made to repeat the aforementioned processing steps. When the determination in step 114 is affirmed, a series of the processing steps are terminated.

When the ignition timing of the vent hole MGG 20 is constantly set and the crash detection portion 24 detects a crash during the running of the vehicle as described above, an ignition signal is output to the airbag inflator 12, and then to the vent hole MGG 20 at the set timing. Thus, the bag body 14 of the airbag device 10 is deployed to absorb an impact on the occupant, and the pressure of the bag body 14 for absorbing an impact on the occupant can be made appropriate depending on whether or not the lid member 17 that closes the vent hole 16 opens.

Then, in this embodiment of the invention, even when there is no need to open the lid member 17 that closes the vent hole 16, the vent hole MGG 20 is ignited at the timing that is uninfluential on other mechanisms and that is different from the preset timing for opening the lid member 17 that closes the vent hole 16. Therefore, in discarding the airbag device 10 after the deployment of the bag body 14, the airbag device 10 can be easily discarded with the troublesome operation of igniting the vent hole MGG 20 omitted.

This embodiment of the invention has been described citing the exemplary case where the necessity to open the vent hole 16 is set in accordance with a signal indicating whether or not the occupant wears the seat belt 18. However, the invention is not limited to this case. For example, the invention may be applied to an occupant protection device designed such that the vent hole 16 is opened on the basis of at least one parameter selected from information on whether or not an occupant wears the seat belt 18 at the time of a crash, information on an intensity of the crash including a type of the crash, information on a build of the occupant, and information on a posture of the occupant at the time of the crash.

Figure 5:
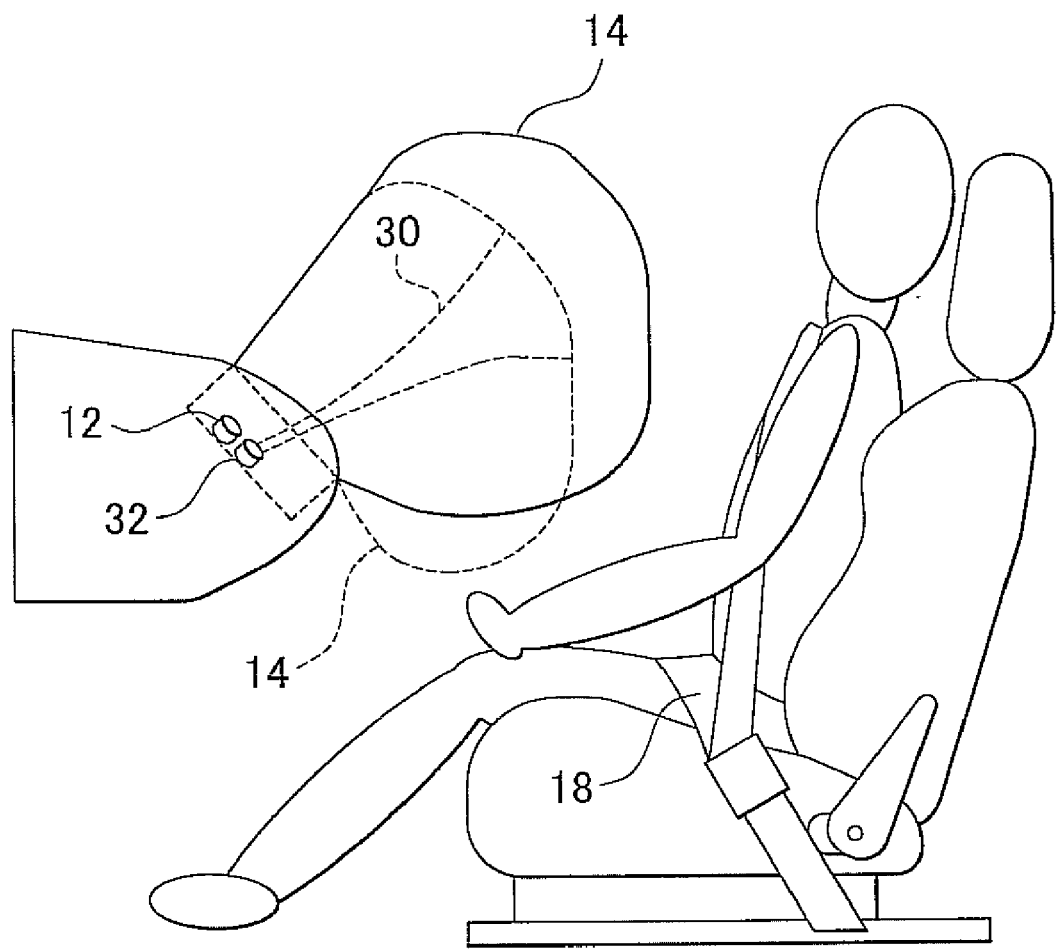
FIG. 5 is a view showing an airbag device that changes a deployment capacity of a bag body by means of a strap.

Further, the first embodiment of the invention has been described referring to the exemplary case where the vent hole 16 is selectively opened. However, the invention is not limited to this case. For example, the invention may be applied to an occupant protection device designed as an airbag device whose bag body 14 has a selectively variable deployment capacity. For example, as shown in FIG. 5, the invention is applicable to an occupant protection device that is designed as an airbag device whose bag body 14 has provided therein a strap 30 for regulating the size of deployment of the bag body 14 and that is equipped with a mechanism for separating the strap 30 by a strap MGG 32. In this case, the bag body 14 is deployed by igniting the airbag inflator 12. The strap MGG 32 is then ignited on the basis of at least one parameter selected from, for example, information on whether or not an occupant wears the seat belt 18 at the time of a crash, information on an intensity of the crash including a type of the crash, information on a build of the occupant at the time of the crash, and information on a posture of the occupant at the time of the crash. The regulation of the strap 30 is canceled by igniting the strap MGG 32. On the condition that the strap MGG 32 not be ignited, the strap MGG 32 may be ignited at a timing that is uninfluential on other mechanisms and that is different from a preset timing for canceling the regulation of the strap 30.

Further, the invention may be applied to an occupant protection device equipped with the mechanism that selectively opens the vent hole 16 according to the first embodiment of the invention and the mechanism that selectively changes the size of deployment of the bag body 14 by the strap 30 shown in FIG. 5. In this case, if a condition for actuating one of the MGG's is fulfilled and a condition for actuating the other MGG is unfulfilled, the airbag control ECU 22 performs control such that that one of the MGG's whose condition is fulfilled is actuated. After that, it is appropriate to perform control such that the other MGG whose condition is unfulfilled is actuated at a timing that is uninfluential on the actuation state of the mechanism actuated by that one of the MGG's and that is different from a preset timing for actuating the mechanism actuated by the other MGG whose condition is unfulfilled.

The first embodiment of the invention has been described as to the case where the invention is applied to the airbag device equipped with the two gas generators (the inflator and the MGG). However, the second embodiment of the invention will be described as to a case where the invention is applied to a seat belt retractor device for retracting a seat belt, which is equipped with two gas generators (an inflator and an MGG). Components identical to those of the first embodiment of the invention will be described with the same reference symbols assigned thereto respectively.

Figure 6A:
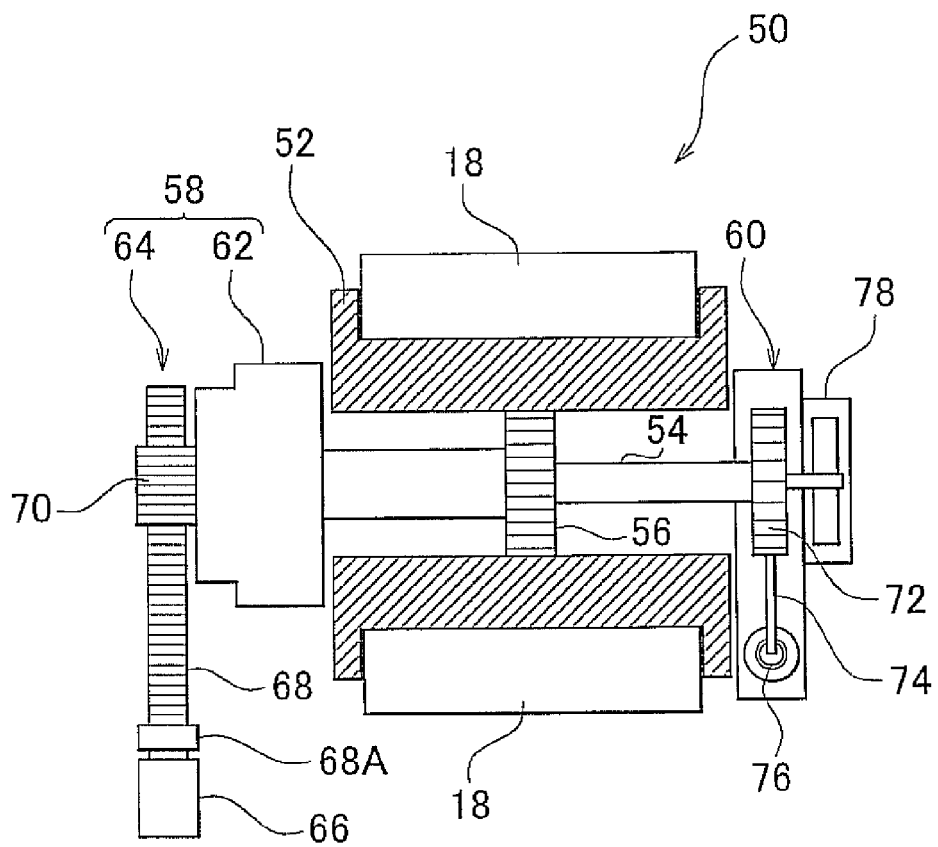
FIG. 6A is a cross-sectional view showing a schematic construction of a seat belt retractor unit according to the second embodiment of the invention.

FIG. 6A is a cross-sectional view showing a schematic construction of the seat belt retractor device according to the second embodiment of the invention.

As shown in FIG. 6A, a seat belt retractor device 50 is equipped with a spool 52 for retracting the seat belt 18. The spool 52 has a hollow central region, and a torsion bar 54 is provided in the hollow region. The torsion bar 54 is coupled in the vicinity of a center thereof to the spool 52 via a coupling member 56, and functions as a rotary shaft of the spool 52. Further, the torsion bar 54 has a diameter that changes across the coupling member 56. More specifically, the torsion bar 54 is larger in diameter on a pretensioner mechanism portion 58 side than on a later-described force limiter mechanism portion 60 side.

The pretensioner mechanism portion 58 is provided at one end of the torsion bar 54, and the later-described force limiter mechanism portion 60 is provided at the other end of the torsion bar 54.

The pretensioner mechanism portion 58 is equipped with a belt lock mechanism 62 and a pretensioner mechanism 64.

When a predetermined load is applied to the belt lock mechanism 62, the belt lock mechanism 62 locks rotation of the spool 52. Various known arts are applicable to the belt lock mechanism 62. Therefore, the belt lock mechanism 62 will not be described in detail.

The pretensioner mechanism 64 is equipped with a pretensioner gas generator (inflator) 66 for generating gas, a piston rack 68, and a pinion gear 70. When the pretensioner inflator 66 is ignited, a piston 68A of the piston rack 68 is extruded, and the spool 52 is thereby rotated by a rack gear of the piston rack 68 and the pinion gear 70. The pretensioner mechanism portion 58 thereby retracts the seat belt 18.

On the other hand, the force limiter mechanism portion 60 is a mechanism designed as follows. When a tensile force exceeding a predetermined load is applied to the seat belt 18 with the belt lock mechanism 62 locked, the torsion bar 54 is twisted, the spool 52 coupled to the torsion bar 54 via the coupling member 56 rotates, and the seat belt 18 is drawn out. Thus, the tensile force applied to the seat belt 18 is held constant.

To be specific, the force limiter mechanism portion 60 is equipped with a gear 72 engaged with the torsion bar 54, a cam 74, and a force limiter MGG 76.

The gear 72 is provided with a lock member that meshes with the cam 74 to limit rotation of the gear 72 when a tensile force exceeding a predetermined load is applied to the seat belt 18.

When the force limiter MGG 76 is ignited, the cam 74 is moved due to the pressure of gas. Thus, the cam 74 and the gear 72 do not mesh with each other and hence are not locked with each other despite the application of the tensile force exceeding the predetermined load to the seat belt 18.

Further, a spring mechanism 78 for urging the spool 52 in such a direction as to retract the seat belt 18 is provided outside the force limiter mechanism portion 60. Owing to the spring mechanism 78, the seat belt 18 is retracted by the spool 52.

In this embodiment of the invention, the seat belt 18 is retracted through the actuation of the pretensioner mechanism 64. When the seat belt 18 is drawn out due to the movement of the occupant, the belt lock mechanism 62 is locked, and the force limiter mechanism portion 60 starts to be actuated.

In the force limiter mechanism portion 60, when the cam 74 and the gear 72 are locked with each other by the lock member and a tensile force exceeding a predetermined load is applied to the seat belt 18 with the cam 74 and the gear 72 engaged with each other, the entire torsion bar 54 is twisted. The spool 52 coupled to the torsion bar 54 via the coupling member 56 then rotates, and the seat belt 18 is drawn out. Thus, the tensile force applied to the belt is held constant.

Further, when the force limiter MGG 76 is ignited on the basis of information on the weight of the occupant or the like, the cam 74 and the gear 72 in the force limiter mechanism portion 60 cease to mesh with each other. Therefore, the torsion bar 54 is twisted only on the pretensioner mechanism portion 58 side by the coupling member 56. The spool 52 coupled to the torsion bar 54 via the coupling member 56 then rotates, and the seat belt 18 is drawn out. Thus, the tensile force applied to the belt is held constant but lower than the above-mentioned tensile force.

Figure 6B:
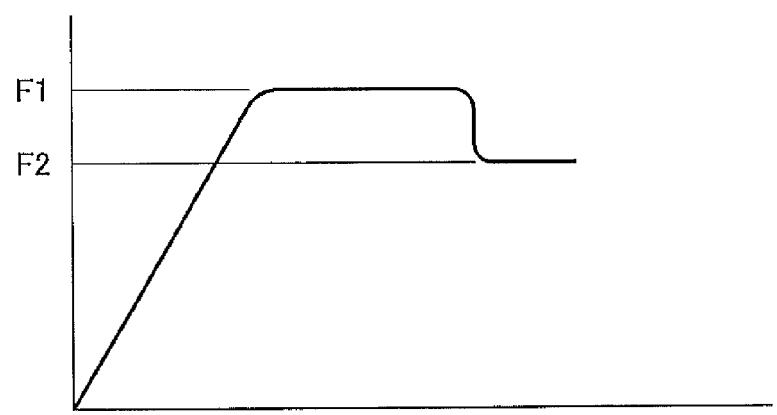
FIG. 6B is a view showing changes in a tensile force applied to a seat belt by a force limiter mechanism portion according to the second embodiment of the invention.

That is, when the force limiter MGG 76 is not ignited, the tensile force applied to the seat belt 18 is held equal to a tensile force F1 shown in FIG. 6B. When the force limiter MGG 76 is ignited, the tensile force applied to the seat belt 18 is held equal to a tensile force F2 shown in FIG. 6B.

Figure 7:
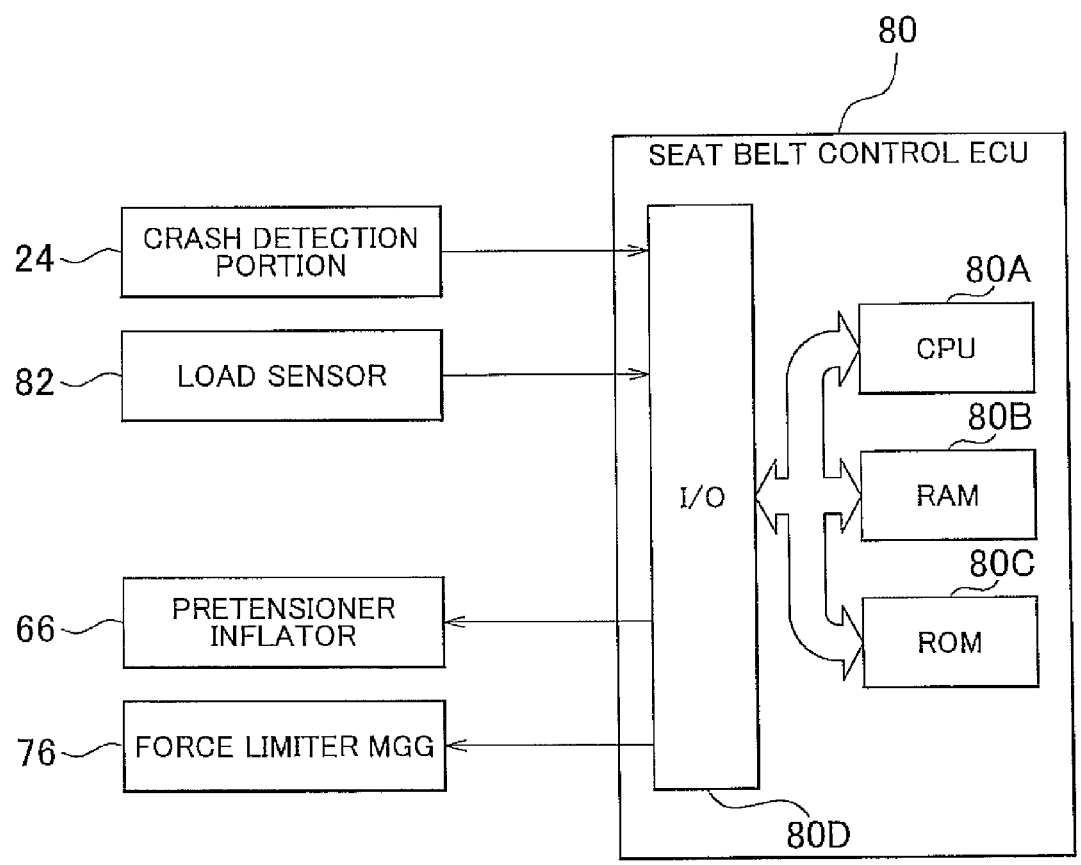
FIG. 7 is a block diagram showing a configuration of the seat belt retractor unit according to the second embodiment of the invention.

FIG. 7 is a block diagram showing the configuration of the seat belt retractor device 50 according to the second embodiment of the invention.

In the seat belt retractor device 50 according to the second embodiment of the invention, a seat belt control ECU 80 controls the tensile force applied to the seat belt 18.

The seat belt control ECU 80 is constituted by a microcomputer equipped with a CPU 80A, a RAM 80B, a ROM 80C, and an input/output interface (I/O) 80D.

The ROM 80C has stored therein various programs for controlling the tensile force applied to the seat belt 18, a threshold for controlling the tensile force applied to the seat belt 18, and the like.

The CPU 80A expands the programs and the like stored in the ROM 80C into the RAM 80B and the like to control the tensile force applied to the seat belt 18.

The crash detection portion 24, a load sensor 82, the pretensioner inflator 66, and the force limiter MGG 76 are connected to the I/O 80D.

The crash detection portion 24 includes crash detection sensors provided on a vehicle floor, a front side member, and the like, an acceleration sensor, and the like. The crash detection portion 24 detects a crash of the vehicle, and outputs a result of the detection to the seat belt control ECU 80.

The load sensor 82 is provided in a vehicular seat to detect the weight of the occupant and output a result of the detection to the seat belt control ECU.

Upon receiving an ignition signal from the seat belt control ECU 80, the pretensioner inflator 66 is ignited to generate gas. Due to the pressure of this gas, the pretensioner inflator 66 moves the piston rack 68 to rotate the pinion gear 70. When the pinion gear 70 rotates, the spool 52 rotates as well. As a result, the seat belt 18 is retracted.

Upon receiving an ignition signal from the seat belt control ECU 80, the force limiter MGG 76 is ignited to generate gas. Due to this gas, the cam 74 moves and ceases to mesh with the gear 72. As a result, the tensile force applied to the seat belt 18 is held equal to the tensile force F2 shown in FIG. 6B.

In this embodiment of the invention, when the crash detection portion 24 detects a crash, the seat belt control ECU 80 outputs an ignition signal to the pretensioner inflator 66. Thus, the pretensioner inflator 66 is ignited, and the seat belt 18 is retracted to restrain the occupant. Further, when the occupant turns out to be lighter than a predetermined load on the basis of a result of detection of the load sensor 82 at this time, the seat belt control ECU 80 outputs an ignition signal to the force limiter MGG 76 to ignite the force limiter MGG 76, thereby performing control to reduce the tensile force applied to the seat belt 18 (to F2 shown in FIG. 6B). When the occupant is equal to or heavier than the predetermined load, the seat belt control ECU 80 outputs an ignition signal to the pretensioner inflator 66, and then outputs an ignition signal to the force limiter MGG 76 after the lapse of a predetermined time.

That is, in this embodiment of the invention, when there is no need to ignite the force limiter MGG 76, the force limiter MGG 76 is ignited at a timing that is uninfluential on the pretensioner mechanism and that is different from a preset timing for reducing the tensile force applied to the seat belt 18 (to F2 in FIG. 6B). Thus, as is the case with the first embodiment of the invention, the pretensioner inflator 66 is ignited, and the seat belt retractor device 50 can be easily discarded with the troublesome operation of igniting the force limiter MGG 76 omitted.

FIG. 8 is a flowchart showing an example of the flow of a seat belt tensile force control processing performed by the seat belt control ECU 80 of the seat belt retractor device 50 according to the second embodiment of the invention. This processing is started when the ignition switch is turned on.

First of all in step 200, a seat load is detected, and a transition to step 202 is made. That is, the load sensor 82 detects a weight of the occupant.

In step 202, the CPU 80A determines whether or not a crash has been detected. In this determination, the CPU 80A determines whether or not a crash has been detected by the crash detection portion 24. When this determination is denied, a return to step 200 is made to repeat the aforementioned processing. When this determination is affirmed, a transition to step 204 is made.

In step 204, the CPU 80A determines whether or not the detected seat load is equal to or larger than a predetermined load. When this determination is affirmed, a transition to step 206 is made. When this determination is denied, a transition to step 208 is made.

In step 206, the force limiter MGG is ignited after the lapse of the predetermined time from the ignition of the pretensioner inflator 66, and a series of seat belt tensile force control processing steps are thereby terminated. In this case, the force limiter MGG 76 is ignited at a timing (after the lapse of the predetermined time) that is uninfluential on the force limiter mechanism and that is different from a preset timing for reducing the tensile force applied to the tensile force 18. That is, in the case where the occupant is heavy (e.g., equal to or larger than a predetermined load), when retracting the seat belt 18 to hold the tensile force applied thereto constant, the tensile force applied to the seat belt 18 is held equal to the tensile force F1 shown in FIG. 6B until the lapse of the predetermined time.

On the other hand, in step 208, the pretensioner inflator 66 and the force limiter MGG 76 are ignited in synchronization with each other, and the series of the seat belt tensile force control steps are thereby terminated. That is, in the case where the occupant is light (smaller than the predetermined load), when retracting the seat belt 18 to hold the tensile force applied thereto constant, the tensile force applied to the seat belt 18 is held equal to the tensile force F2 shown in FIG. 6B.

Thus, in this embodiment of the invention, even when there is no need to ignite the force limiter MGG 76, the force limiter MGG 76 is ignited at the timing that is uninfluential on other mechanisms and that is different from the preset timing for reducing the tensile force applied to the seat belt 18 (at the timing after the lapse of the predetermined time from the timing when the pretensioner inflator 66 is ignited). Therefore, the pretensioner mechanism 58 is actuated, and the force limiter MGG 76 as well as the pretensioner inflator 66 is ignited in discarding the seat belt retractor device 50. Therefore, the seat belt retractor device 50 can be easily discarded without recourse to any troublesome operation.

In the second embodiment of the invention, the actuation of the force limiter MGG 76 is controlled using the build (weight) of the occupant at the time of the crash as the parameter. However, the parameter is not limited to the information on the build of the occupant at the time of the crash. For example, the actuation of the force limiter MGG 76 may be controlled using a parameter such as information on whether or not the occupant wears the seat belt 18 at the time of the crash, information on the intensity of the crash including the type of the crash, information on the posture of the occupant at the time of the crash, or the like. Further, the actuation of the force limiter MGG 76 may be controlled using a combination of at least two parameters selected from information on whether or not the occupant wears the seat belt 18 at the time of the crash, information on the intensity of the crash including the type of the crash, information on the build of the occupant at the time of the crash, and information on the posture of the occupant at the time of the crash.

Further, each of the foregoing embodiments of the invention has been described citing the example of the occupant protection device equipped with the two gas generators. However, the invention is not limited to such an occupant protection device. The invention may also be applied to an occupant protection device equipped with three or more gas generators, and those of the gas generators which do not fulfill an actuation condition may be actuated at a timing uninfluential on other mechanisms on the condition that even one of the gas generators not be actuated.

Further, each of the foregoing embodiments of the invention has been described citing the exemplary case of the occupant protection device equipped with the gas generators for actuating the mechanisms for protecting the occupant (the airbag inflator 12 and the pretensioner inflator 66) and the gas generators for supplementing the occupant protection function (the vent hole MGG 20, the strap MGG 32, the force limiter MGG 76, and the like). However, the invention is not limited to such an occupant protection device. For example, in the case where an occupant protection device is equipped with gas generators (inflators) for actuating a plurality of airbag devices (an airbag device for a driver seat, an airbag device for a passenger seat, a side airbag device, and the like) respectively and there is a reason for the replacement of all the airbag devices when even one of the plurality of the airbag devices is deployed, the invention may be applied such that the gas generators for those of the airbag devices which need not be deployed are ignited at a timing that is uninfluential on the others and that is different from a preset timing for actuating those of the airbags which need not be deployed.

What is claimed is:

1. An occupant protection device comprising:
    an airbag bag body for protecting the occupant, the airbag bag body having a vent hole formed in the airbag bag body;
    a ventilation mechanism for adjusting an internal pressure of the airbag bag body, the ventilation mechanism having a lid member and a strap, the lid member covers the vent hole;
    a first gas generator that generates gas for deploying the airbag bag body;
    a second gas generator that generates gas for actuating the ventilation mechanism, the second gas generator is connected to the lid member by the strap, the actuation of the second gas generator actuates the ventilation mechanism such that the vent hole is opened by pulling the strap connected to the lid member so as to uncover the vent hole due to the gas generated by the second gas generator; and
    a control portion that performs control such that the first gas generator is actuated if a condition for actuating only the airbag bag body is fulfilled, and the control portion performs control such that the second gas generator is actuated at a timing after a lapse of a predetermined time from a timing when the first gas generator is actuated such that the actuation of the second gas generator is uninfluential on deployment of the airbag bag body, and wherein the predetermined time is different from a preset timing for actuating the ventilation mechanism.

2. The occupant protection device according to claim 1, wherein the condition for actuating the first gas generator is a condition regarding crash information, and
    the condition for actuating the second gas generator is a condition having at least one of information on whether the occupant wears a seat belt, information on an intensity of a crash, information on a build of the occupant, and information on a posture of the occupant as a parameter.

3. The occupant protection device according to claim 1, further comprising
    a detection portion that detects at least one parameter selected from information on whether an occupant wears a seat belt, information on an intensity of a crash, information on a build of the occupant, and information on a posture of the occupant.

4. The occupant protection device according to claim 3, further comprising
    a vehicle speed detection portion that detects a vehicle speed,
    wherein only the condition for deploying the airbag bag body is fulfilled if the detection portion detects that the occupant wears the seat belt and the vehicle speed detection portion detects that the vehicle speed is equal to or higher than a predetermined vehicle speed.

* * * * *